UNITED STATES PATENT OFFICE.

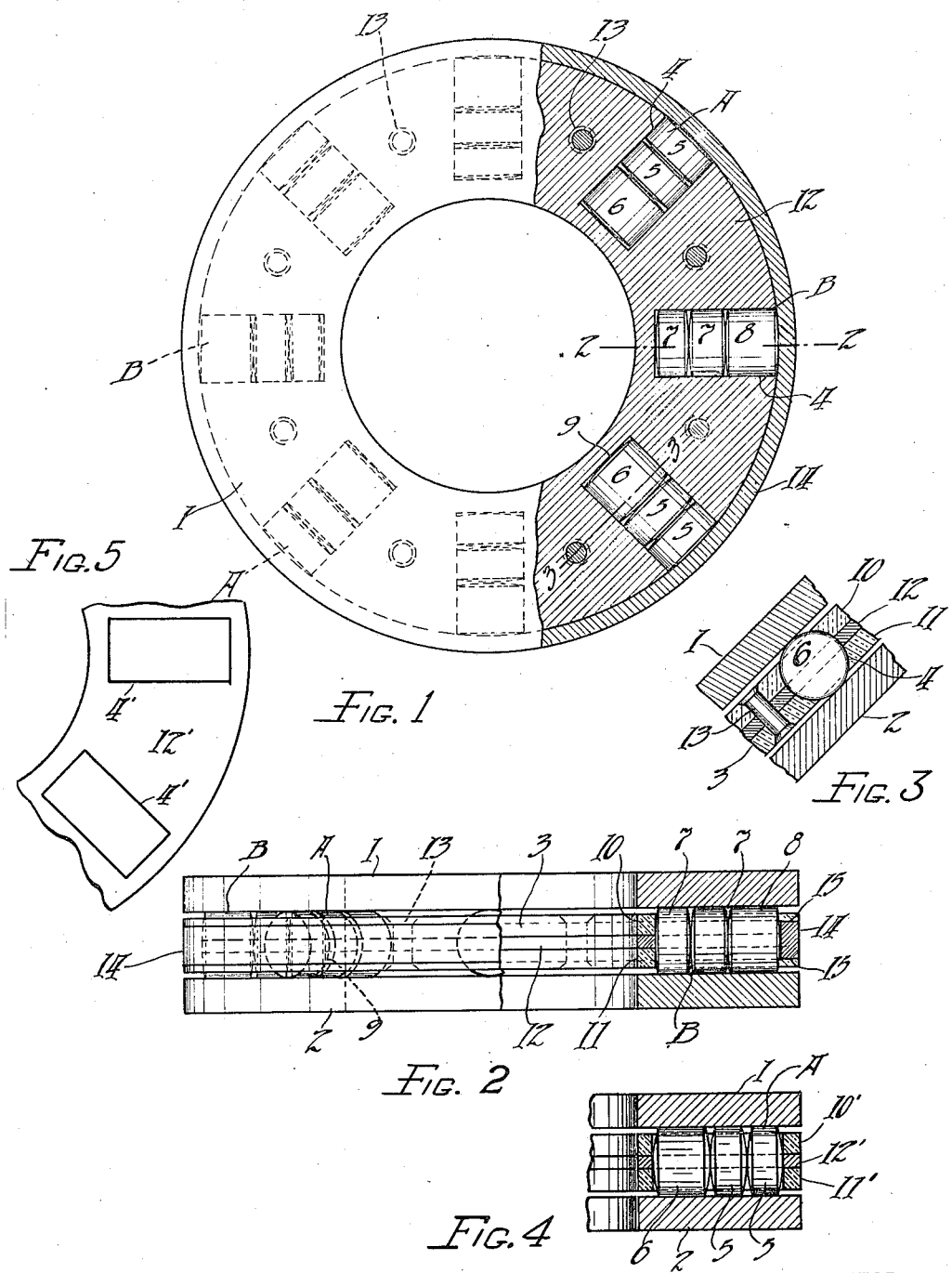

ORLANDO W. HART, OF FALL RIVER, MASSACHUSETTS.

ROLLER-BEARING.

1,300,386.   Specification of Letters Patent.   Patented Apr. 15, 1919.

Application filed June 15, 1918. Serial No. 240,140.

*To all whom it may concern:*

Be it known that I, ORLANDO W. HART, a citizen of the United States, and a resident of Fall River, in the county of Bristol and State of Massachusetts, have invented certain new and useful Improvements in Roller-Bearings, of which the following is a description.

My invention relates to roller bearings, and more particularly to anti-friction thrust bearings wherein a plurality of bearing rollers or series of bearing rollers are arranged with their axes substantially radial to the axis of the bearing and are disposed between a pair of relatively rotatable members, such as a pair of annular hardened wearing plates, to transmit the thrust from one to the other of such members and reduce the friction to a minimum. In some aspects the present invention is an improvement on the bearing described and claimed in my copending application Serial No. 208,117, filed December 20, 1917, and entitled Roller bearings.

In thrust bearings of this type, cylindrical bearing or thrust rollers are employed which are maintained in proper relative position by means of a cage or spacing member. This cage is usually in the form of an annular plate of comparatively soft material, such as brass, having a plurality of radial cylindrical sockets extending inwardly from its periphery in which the rollers or series of rollers are respectively disposed and closely fit. This plate is slightly less in thickness than the diameter of the rollers and the latter therefore extend beyond the cage for engagement with the opposed faces of the hardened wearing plates between which the rollers and cage are disposed.

The principal object of my invention is to provide an improved cage or spacing member for roller bearings, especially for bearings of the type described above, whereby substantial wear of the side walls of the roller sockets of the cage and displacement of the rollers, due to skewing action or the like, are prevented.

Another object of my invention is to provide an improved cage for bearings of the type described above, wherein wear of the bottom or inner walls of the roller sockets is substantially eliminated.

A further object of my invention is to provide improved means for maintaining the parts of the bearing in assembled position and for taking up outward thrusts imposed on the rollers.

My invention also comprises a construction for attaining these objects which is simple and which is very economical and practical to manufacture.

Other objects and features of my invention will be hereinafter more fully described and claimed.

For a clearer understanding of my invention, attention is directed to the drawing accompanying and forming a part of this specification, in the several views of which the same reference characters are employed to designate corresponding parts, and in which:

Figure 1 is a plan view, partly in section, of an anti-friction thrust bearing in accordance with my invention;

Fig. 2 is a view of the bearing in side elevation, being shown partly in section on line 2—2 of Fig. 1;

Fig. 3 is a sectional view taken on line 3—3 of Fig. 1, parts being shown in elevation;

Fig. 4 is a detailed sectional view of a modification; and

Fig. 5 is a fragmental plan view of the hardened plate of the cage or spacing member of the bearing shown in Fig. 4.

Referring to the drawing, and especially to Figs. 1 to 3, reference characters 1 and 2 represent a pair of relatively rotatable members constituting parts of a thrust bearing, these members being shown as hardened annular plates of the same internal and external diameter concentrically arranged with their axes coinciding with the axis of the bearing. For the purpose of transmitting the thrust from one to the other of the plates 1 and 2, a plurality of series A and B, of preferably cylindrical rollers, are disposed therebetween, such series of rollers being arranged substantially radially with respect to the axis of the bearing and preferably being equi-spaced about such axis. To maintain the series of rollers properly spaced and properly positioned with respect to the axis of the bearing, a spacing member or cage 3 is employed. This cage is preferably in the form of a flat annular ring or plate having the same internal and external diameters as the plates 1 and 2 and is provided with a plurality of equal sized cylindrical radial sockets or recesses 4 in which the series of rollers A and B are respectively disposed and closely fit. As shown in Figs. 2 and 3 the cage 3 has a thickness somewhat less than the diameter of the rollers, the rollers therefore extending beyond the cage 3 for engagement with the opposed polished surfaces of the hardened annular wearing plates 1 and 2. In order to prevent the formation of ridges and grooves on the bearing or roller tracking surfaces of the plates 1 and 2, the rollers in adjacent series are staggered; the outer rollers 5, 5 of each series A preferably being of the same length and the inner roller 6 of each series A preferably being considerably longer than either roller 5, and the inner rollers 7, 7 of each of the series B preferably being of the same length, equal to the length of the rollers 5, and the outer roller 8 of each series B preferably being longer than either roller 7, and equal to the length of rollers 6. For the purpose of reducing the friction at the ends of the rollers 5, 6, 7 and 8, the ends of these rollers are preferably formed spherically as shown at 9.

The spacing member or cage for the rollers in bearings of the type described herein, is usually made of comparatively soft material, such as brass, on which the hardened steel rollers will run smoothly and easily. However, owing to the difference in the diameter, and therefore in the length, of the different portions of the annular tracking surface for the rollers on each of the opposed wearing plates, each roller has a decided tendency to skew and to assume a position in which its axis is tangential to the pitch line passing through its center. Accordingly, the rollers will wear the soft walls of the sockets in the separator or spacing member and will become more and more displaced from their proper radial positions with reference to the axis of the bearing. The rollers will therefore be dragged on the hardened wearing plates and proper rolling movement of the rollers on the wearing plates is thus prevented. This soon results in serious damage to the rollers and to the polished surfaces of the bearing plates. These defects are especially pronounced in bearings of this type wherein a plurality of radially arranged rollers are disposed in each of the sockets of the cage, for the rollers in each socket as they skew will also wear and damage each other. In order to obviate these defects, I preferably form the spacing member or cage 3 of a plurality of plates, preferably three, 10, 11 and 12, rigidly and permanently secured together as by means of rivets 13. The two outer plates 10 and 11 are preferably formed of comparatively soft material, such as brass, and are preferably considerably thicker than the intermediate plate 12, which is preferably formed of hardened steel. As the hardened plate 12 is located substantially at the middle of the spacing member 3, it will be apparent that the central portions of the side and bottom walls of all the sockets 4, where such sockets are widest and where the greatest pressure is exerted by the rollers and the greatest wear tends to take place, are formed on this plate. Accordingly, by the use of the hardened plate 12, the wear on the side walls of the sockets 4 due to the skewing tendency of the rollers in the operation of the bearing, and also appreciable wear of the bottom walls of these sockets due to inward thrusts imposed on the rollers, are reduced to a minimum without appreciably affecting the desired smooth easy turning of the rollers in the sockets.

In the bearing shown in Figs. 1 to 3, the sockets 4 are each substantially equal in length to the series of rollers A or B disposed therein, and the outer ends thereof are flush with the periphery of the hardened plate 12. The plates 10 and 11 extend outwardly beyond the ends of the sockets 4 and the plate 12, a distance equal to the thickness of a hardened endless steel ring 14 which is rigidly secured therebetween when the plates 10, 11 and 12 are fastened together with the rollers 5, 6, 7 and 8 in the sockets 4, during the assembly of the bearing. The opposed faces of the edge portions of the plates 10 and 11 are provided with annular recesses 15 forming seats for the edges of the ring 14. This hardened ring 14, which, as shown, is maintained in position without the use of pins, screws or similar holding means, serves to take up all outward thrusts imposed on the rollers.

In the construction shown in Figs. 4 and 5, the cage or spacing member for the rollers is composed of two outer plates 10' and 11' of comparatively soft material, and an intermediate thinner hardened plate 12'; these plates being suitably secured together and respectively corresponding to the plates 10, 11 and 12 shown in Figs. 1 to 3. The plate 12', however, is of the same internal and external diameters as the plates 10' and 11', and the outer end of the portion 4' of each of the roller sockets in the plate 12' is correspondingly spaced inwardly from the periphery of this plate. It is thus seen that the apertures or openings 4' comprising parts of the roller sockets are entirely surrounded by the plate 12'; in other words, each wall of these openings is formed by the plate 12'. With this construction it is unnecessary to employ a ring such as shown at 14 in Fig. 2, or to recess the plates 10' and 11' to receive such ring, outward thrusts being taken up without substantial wear by the outer walls of the openings 4. A cage of this construction is easier and cheaper to make than the one constructed as shown in Figs. 1 to 3, and the parts thereof together with the rollers can be more readily assembled. If the plate 12' is not too thick, the openings 4' may be stamped or punched therein, as the walls thereof would, in that case, form but a comparatively small part of the walls of the roller sockets and are located at the middle of the sockets. It will be obvious from the foregoing that in many cases the construction shown in Figs. 4 and 5 is preferable to that shown in Figs. 1 to 3.

A bearing constructed as described herein is very efficient and is adapted for use at high speeds with a minimum of friction and wear. A bearing of this construction is also extremely practical and easy to manufacture and assemble.

It is to be understood that the specific bearing shown and described herein is subject to numerous changes and modifications without any departure from the spirit of my invention and the scope of the appended claims. For example, my invention is adapted for bearings wherein single rollers are employed instead of series of rollers, and some features thereof are applicable to any bearings wherein one or more rollers are mounted in or positioned by a cage.

Having now described my invention, what I claim and desire to protect by Letters Patent is as follows:—

1. In an anti-friction bearing, bearing rollers, and a cage provided with sockets in which said rollers are disposed, said cage comprising plates of different degrees of hardness rigidly secured together.

2. In an anti-friction bearing, bearing rollers, and a cage provided with sockets in which said rollers are disposed, said cage comprising a hard member and a comparatively soft member rigidly secured together, each of said sockets being formed partly in one of said members and partly in the other.

3. In an anti-friction thrust bearing, bearing rollers, and an annular composite spacing or separator member provided with radial cylindrical sockets in which said rollers are disposed, said member comprising a pair of comparatively soft outer plates and an intermediate hard plate.

4. In an anti-friction thrust bearing, bearing rollers, and an annular composite spacing or separator member provided with radial cylindrical sockets in which said rollers are disposed, said member comprising a pair of comparatively soft outer plates and an intermediate hard plate, said hard plate being thinner than each of said outer plates.

5. In an anti-friction thrust bearing, bearing rollers, and an annular composite spacing or separator member provided with radial cylindrical sockets in which said rollers are disposed, said member comprising a pair of comparatively soft outer plates and an intermediate hard plate, the central portion of each of the side and bottom walls of each socket being formed by said hard plate.

6. A socketed cage for roller bearings, comprising a plurality of plates rigidly secured together and of different degrees of hardness.

7. A socketed cage for roller bearings comprising a pair of comparatively soft plates and a comparatively hard plate interposed therebetween, each of the sockets being partially formed in each of said plates.

8. A socketed cage for roller bearings comprising a plurality of members of different degrees of hardness, each of the sockets being partially formed in each of said members.

9. A cage for roller bearings having a plurality of cylindrical sockets and comprising a hard plate and a comparatively soft plate, portions of each of the side and bottom walls of each socket being formed in each plate.

10. In an anti-friction thrust bearing, bearing rollers, and an annular composite spacing or separator member provided with radial cylindrical sockets in which said rollers are disposed, said member comprising a pair of comparatively soft outer plates and an intermediate hard plate, the central portion of each of the walls of each socket being formed by said hard plate.

11. A cage for roller bearings having a plurality of cylindrical sockets and comprising a hard plate and a comparatively soft plate, portions of each of the walls of each socket being formed in each plate.

12. A cage for roller bearings having a plurality of cylindrical sockets and comprising a hard plate and a comparatively soft plate, a portion of each wall of each socket being formed in said hard plate.

13. In a roller bearing, one or more bearing rollers, and a cage in which said rollers are disposed, said cage comprising a hardened plate having one or more openings for said rollers, the walls of which openings entirely embrace the rollers disposed therein and are formed by said plate.

14. In a roller bearing, one or more bearing rollers, and a cage having one or more sockets in which said rollers are disposed, said cage comprising a comparatively soft plate and a hard plate each having one or more openings respectively forming a portion of said sockets, the walls of each opening in the hard plate entirely surrounding the rollers disposed therein and being formed on the plate.

This specification signed this 8th day of June, 1918.

ORLANDO W. HART.